United States Patent [19]

Luxon

[11] Patent Number: 4,668,578
[45] Date of Patent: May 26, 1987

[54] SURFACE TREATED METALLIC FILAMENTS

[75] Inventor: Bruce A. Luxon, Stamford, Conn.

[73] Assignee: American Cyanamid Company, Stamford, Conn.

[21] Appl. No.: 670,779

[22] Filed: Nov. 13, 1984

[51] Int. Cl.⁴ ............... B05D 3/02; B32B 9/00; B32B 15/00; D02G 3/00
[52] U.S. Cl. .................... 428/367; 427/387; 428/379; 428/391; 428/408
[58] Field of Search ........... 428/364, 7, 8, 378, 428/9, 392, 5, 447, 450, 391, 408; 427/387

[56] References Cited

U.S. PATENT DOCUMENTS

| | | | |
|---|---|---|---|
| 3,088,847 | 5/1963 | Pines | 427/388.1 |
| 3,191,286 | 6/1965 | Armstrong et al. | 427/327 |
| 3,782,999 | 1/1974 | Marzocchi | 427/404 |
| 4,118,540 | 10/1978 | Amort et al. | 427/388.4 |
| 4,364,731 | 12/1982 | Norling et al. | 427/419.2 |
| 4,481,249 | 11/1984 | Ebneth et al. | 428/408 X |
| 4,511,663 | 4/1985 | Taylor | 428/367 X |
| 4,518,653 | 5/1985 | McWilliams et al. | 428/391 X |

FOREIGN PATENT DOCUMENTS

| | | | |
|---|---|---|---|
| 2350360 | 5/1974 | Fed. Rep. of Germany | 427/409 |
| 1266017 | 5/1961 | France | 427/409 |
| 38-4470 | 4/1963 | Japan | 427/409 |
| 396453 | 1/1974 | U.S.S.R. | 427/315 |

*Primary Examiner*—Michael R. Lusignan
*Attorney, Agent, or Firm*—Michael J. Kelly

[57] ABSTRACT

Metallic filaments, esp., metal-coated fibers, are surface treated by a combination of silane and poly (vinyl acetate) and exhibit improved processability when used in the form of filaments, yarns or tows in knitting and weaving machines, and produce composites with thermosetting organic polymers, having enhanced physical properties.

26 Claims, 1 Drawing Figure

U.S. Patent May 26, 1987 4,668,578
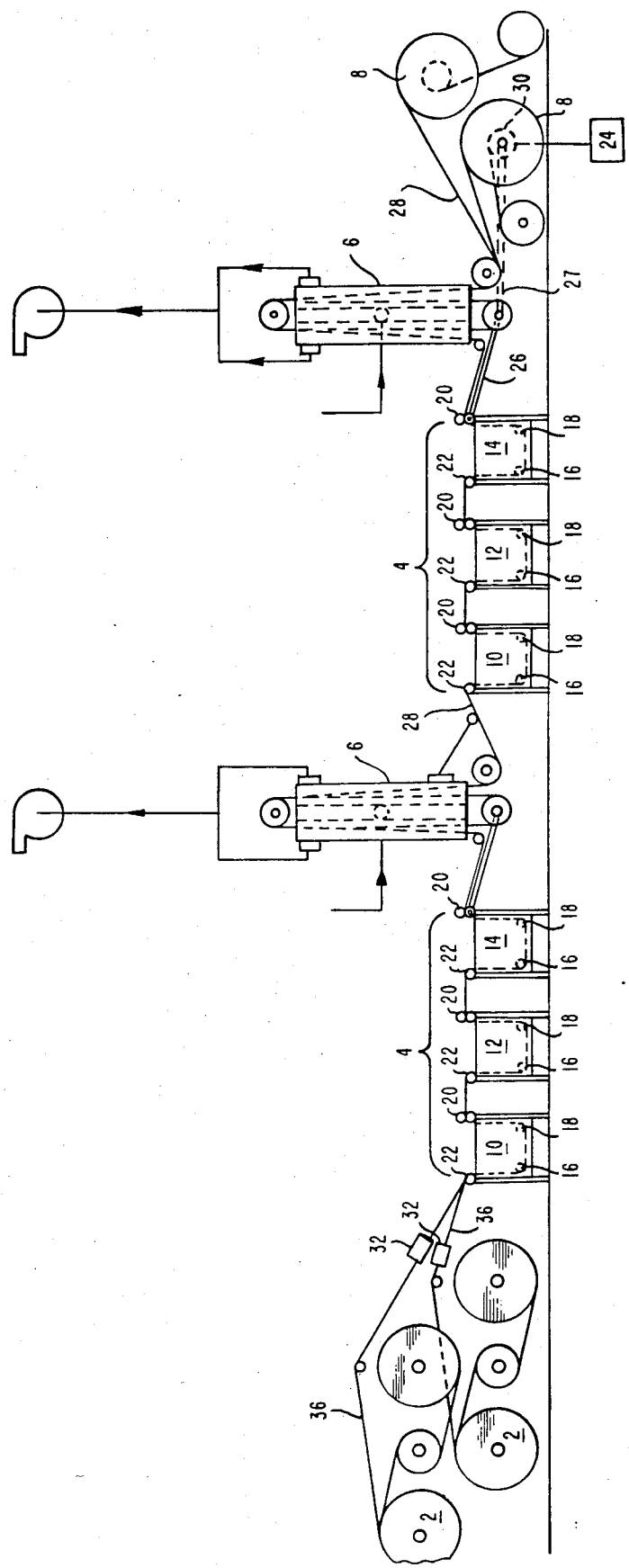

SURFACE TREATED METALLIC FILAMENTS

FIELD OF THE INVENTION

This invention relates generally to the surface treatment of metallic filaments, and particularly metal-plated semimetallic and polymeric fibers. More particularly, the invention relates to surface treating metallic filaments, e.g., metal-plated carbon fibers to afford properties which enhance the fibers as weaving materials and for producing reinforced composites with thermosetting polymeric materials having superior properties.

DESCRIPTION OF THE PRIOR ART

It has been known for some time that metallic filaments, e.g., filaments of metals, and metal coated nonmetals and semimetals such as carbon, boron, silicon carbon, polyesters, polyamides, and the like in the form of filaments, fibers, mats, cloths and chopped strands are extremely desirable and beneficial, for example, in reinforcing organic polymeric materials.

Weaving, braiding or knitting are used to form the filaments into cloth or fabric-like articles, particularly when strength or substance is to be provided in a matrix comprised of the metallic filaments and a polymeric material such as an epoxy, bismaleimide, polyimide, polyether ether ketone, polyetherimide, nylon, a polyester, a phenolic, or a polyolefin such as polypropylene. Sheets of such composites form structural members in aircraft, automobiles, marine equipment and other applications.

Recently, it has been recognized that the properties of the high strength nonmetal or semimetallic filaments such as carbon, or polymeric filaments such as aramid filaments can be enhanced by deposition of metal such as nickel and silver in thin surface coatings. These metallic filaments have the same application as uncoated carbon or polymer filaments but enjoy improved properties such as increased strength in plastic matrixes and electrical conductivity. This makes them especially useful, for example as components in aircraft where lightning strike protection is essential.

Several processes now exist for the production of metallic filaments, e.g., vacuum deposition, ion discharge coating, electroless metal deposition and electrodeposition.

Regardless of the process by which the filaments are obtained or coated with metal, the resulting products are somewhat characterized by a lack of ease with respect to weaving them into fabric-like articles and some difficulty with blending them with organic materials. It is believed that these difficulties are due in part to the fineness of the material and a tendency for fuzz to develop. Additionally, these difficulties are also believed to be due in part to the surface characteristics of the fibers and possibly the presence of random tow material extending from the fiber surface.

In commonly assigned copending application, U.S. Ser. No. 507,602, filed June 24, 1983, incorporated herein by reference, it is disclosed that passing the metallic filaments through a sizing medium, e.g., 0.1 to 2.5 percent of a silane and then heating to dry and set the sizing material on the filaments is a valuable technique to overcome such shortcomings. Moreover, if the process also includes passing the filaments through a medium comprising 15 to 40 percent of poly(vinyl acetate) a desirable bulk density increase is noted, which appears to enhance the ability of the filaments to blend with thermoplastics. However, this large amount of poly(vinyl acetate) tends to cause problems in weaving and knitting and requires "working" of the treated fibers, which are usually in yarns and tows comprising thousands of individual fibers. Working involves passing the yarns or tows through fingers or eyelets, and the like, to sharply change their direction and while this flexibilizes the coating and makes the fibers more amenable to braiding, it is uneconomical and breakage is a serious problem.

It has now been discovered that reducing substantially the amount of poly(vinyl acetate) while maintaining the silane at the same level employed in the process of the said copending application reduces the tendency to break, and renders the filaments uniquely suitable for fabricating into unidirectional tapes, non-woven, woven cloths and fabrics and knitted articles. A most surprising effect in result is also found when the properties of thermoset composites reinforced with the sized fibers of this invention are compared with those of the pending application. Whereas the thermoplastic composites with low poly(vinyl acetate) level treatment may be difficult to blend, thermoset composites according to this invention have enhanced short beam shear strengths both dry and after wet conditioning in comparison with those prepared according to the said Ser. No. 507,602. This discovery makes fibers surface treated according to the present invention uniquely suited for use in high performance aerospace vehicles.

SUMMARY OF THE INVENTION

It is an object of the present invention to provide a process by which metallic filaments, especially metal-coated filaments, can be provided with the properties desirable and necessary for weaving the metal-coated fibers into fabric or mat-like articles.

It is a further object of the invention to provide metallic, filaments with enhanced flexibility.

It is another and further object of the invention to provide metal-coated high strength fibers with a minimum of random fibrils extending outwardly from the basic fiber.

It is yet another object of the invention to provide metallized filaments with a metal oxide surface layer which is subsequently surface treated to enhance weaving, knitting and the like.

It is another object of the invention to provide composites, e.g., laminates, comprising metallized filaments surface treated and/or oxidizing and an organic polymeric matrix, the composites having superior properties, especially short beam shear strength, both dry and after wet conditioning.

The process of the present invention is characterized by delivery of metallic filaments to a medium or combination of media comprising a surface treating agent, e.g., a silane, preferably an aminosilane, in combination with a poly(vinyl acetate). The amounts of silane, preferably aminosilane, and poly(vinyl acetae) should be judiciously selected. In general, they each will comprise from about 0.1 to about 2.5 percent by weight of the medium, preferably from about 0.2 to about 1.2 percent by weight, and especially preferably each will comprise about 0.8 percent by weight. If higher amounts are used, e.g., the 15 percent disclosed in Ser. No. 507,602, physical properties in thermoset composites will be markedly lower. Further processing of the material is also contemplated by passage of the material through dispersants, fluxes, and/or an external lubricant and sizing agent, e.g., polyethylene emulsion, combined with, or after discharge from the surface treating bath. The entire process is conveniently referred to as surface treating. During an intermediate step or after the sizing steps are complete, the fibers can be dried and, preferably, heated, to set the materials on the fibers. Among its features, the present invention also contemplates a process to surface oxidize metallic filaments under controlled conditions in combination with the surface treatment employed herein.

The apparatus used to facilitate the process to surface treat the metallic filaments is typically comprised of one or more tanks, each of which contains idler rollers disposed near the bottom and driven contact rollers above. The tank or tanks have the capacity to maintain emulsions or solutions of surface treating material, i.e., aminosilane and poly(vinyl acetate). Guide rollers are also provided at the entry of each tank. Air-drying means, or means in the form of heating ovens, heated rolls, and the like are provided to dry and set the material after each step or steps, and a driven capstan roller can be provided to afford the principal motive force for the passage of the metal-coated filaments through the bath. Surface oxidation, if desired, is carried out conveniently by way of illustration, in a medium, such as a steam bath, or in a bath of dichromating solution, during which the metal surface reacts with air or an obvious equivalent.

DESCRIPTION OF THE DRAWING

The invention will be more readily understood by reference to the drawing, which is a cross-sectional elevational schematic view of the process of the invention and a suitable apparatus for surface treating and/or surface-oxidizing metallic filaments, e.g., metal-coated high strength fibers.

DETAILED DESCRIPTION OF THE INVENTION

The process of the present invention is directed to providing the surface of metallic filaments and similar articles with properties desirable for weaving and the like, and for producing composites of the product having enhanced physical properties. The process, in essence, provides metallized filaments, e.g., fibers, with a surface comprising a layer of materials that impart various properties to them, such as lubricity and bulk, and enhanced compatibility with plastics, and improved resistance to moisture, e.g., when mixed with polymers.

For convenience, the following discussion will deal with metal-coated fibers, although it is to be understood that metallic filaments can be processed also.

As best seen, in the drawing, a suitable apparatus consists of pay-out reels 2, surface treating sections 4, heating assemblies 6, and a capstan 8. Heated rollers can be substituted for the heating towers 6. As will be explained later, section 4 can comprise a single tank and one or more heating assemblies 6 can be used. Air drying can also be used, but this slows down the overall process. Furthermore, means 32 for providing an oxidized surface, such as low pressure steam boxes, can also be included.

As seen in the drawing, in one embodiment the surface treating section 4 is further comprised of a first tank 10, a second tank 12, and a third tank 14, all of which are adapted to contain surface treating media solutions and to facilitate the continuous flow of metal-coated fibers therethrough. Each tank 10, 12 and 14 is provided with idler rollers 16 and 18 disposed near the bottom of the tank. Rollers 16 and 18 are cylindrical and guide roller 22 is flat bottom, to facilitate tow spread and uniform surface treating.

Each tank is arranged with driven contact rollers 20 and 22 located above the tank in general alignment with the idler rollers 16 and 18. Guide rollers 22 are also located at the entry of each tank.

The optional heating section 6 consists of means for heating the sized metal-coated fiber to dry and set the surface treating solutions or emulsions to the metal-coated carbon fiber. As has been indicated, each tank can be followed by an independent heating section 6.

The drive for the assembly is provided by a motor 24, which transmits drive directly to the capstan 8 and a chain gear assembly comprised of chains 26 and 27, from which the power is transmitted from the capstan gear 30 to the contact roller 20.

In one way of carrying out the present invention, a plurality of metal-coated fibers 36, preferably nickel-coated carbon or nickel-coated aramid, e.g., DuPont KEVLAR 49, fibers is threaded, from the pay-out reels 2 through optional steam boxes 32, over the guide rollers 22 and around the contact rollers 20 under the idler rollers 16 and 18 through one or more of the tanks in one or more sections 4 and preferably through one or more heating sections 6 to the capstan 8. The capstan is then driven by the motor 24, and the process of surface treatment begins. The metal-coated surface-oxidized fibers are drawn through tank 10, which is filled with the surface treating agents such as an aminosilane solution and a poly(vinyl acetate) emulsion. After passage through the tank 10, the metal-coated fiber is essentially provided with a treated surface that has been coupled to the metal oxide surface of the coated fiber. Thereafter, the fiber 36 can be delivered to the tank 12, which contains more of the surface treating agents. Optionally, tank 10 can contain one and tank 12 the other agent. Thereafter, and optionally, the fibers 36 are delivered to tank 14, in which a lubricating agent, e.g., polyethylene solution or emulsion is provided to afford lubricity for the fibers. Alternatively, this can be combined in a single tank with the other surface treating agents.

The surface treated fibers 28 are then either air dried, or preferably delivered to the oven section 6, or to a heated roller (not shown) wherein drying and setting occur and the heated dried fibers 28 are optionally forwarded to a second section 4 and drying section 6 and, finally wound on the capstan roll 8. Although dual stages are shown, for flexibility, depending on the circumstances, only a single stage may be used.

With respect to the silane component, this will typically comprise a surface-reactive coupling silane. Silanes have the general formula $Y-R-Si-X_3$ wherein X represents a hydrolyzable group, e.g., alkoxy; Y is a functional organic group such as methacryloxy, epoxy, etc., and R typically is a small aliphatic linkage, $-(CH_2)_n-$, that serves to attach the functional organic group to silicon (Si) in a stable position. Illustratively, available silanes are: vinyltriethoxysilane, vinyl-tris(-beta-methoxyethoxy) silane, gamma-methacryloxypropyltrimethoxy silane, beta-(3,4-epoxycyclohexyl) ethyltrimethoxysilane, gamma-glycidoxypropyltrimethoxysilane, gamma-aminopropyltriethoxysilane, n-beta(aminoethyl) gamma-aminopropyltriethoxysilane, gammauriedopropyltriethoxysilane, gamma-chloropropyltrimethoxysilane, gamma-mercaptopropyltrimethoxysilane, and the like. The aminosilanes are preferred. All can be used in conventional amounts and in the usual media, as supplied, or diluted with water or an organic solvent, or even as a dry concentrate, e.g., in a fluidized bed.

In practice, it has been found that aminosilane solutions of between 0.1 and 2.5 parts of gamma-amino propyltriethoxysilane such as Dow-Corning Z-6020, or gamma-glycidoxypropyltrimethoxysilane such as Dow-Corning Z-6040, per 100 parts of water adjusted to a pH of between 3.5 and 9, e.g., by acetic acid., are particularly suitable for coupling aminosilanes to nickel- or silver-coated carbon or aramid fibers. Practice has taught that the residence time of the fiber in the solution should be at least sufficient to generate a surface having coupled surface treatment. This will usually be about 0.5 seconds, but the time can be longer, e.g., at least about 5 seconds, depending on downstream residence time requirements.

Practice has taught that a polyvinyl acetate solution of about 0.1 to about 2.5 parts of polyvinyl acetate homopolymer (Borden's Polyco 2113, 55% solids) per 100 parts of water provides a particularly suitable solution for surface characteristics to the metal plated fibers. The residence time for the fiber in the polyvinyl acetate medium should also be at least sufficient to generate the desired surface, preferably at least about 0.5 seconds.

Lubricity can be imparted by optional slip agents or lubricants comprising organic materials conventionally used. Preferably, molecular films will be formed between the sized fibers and surfaces against which they are moved, e.g., loom guides. Such a characteristic reduces tendency to hang-up and abrade. Illustrative lubricants are fatty alcohols, fatty acid esters, glycerol partial esters, polyesters, fatty acid amides, e.g., oleamide, metal soaps, fatty acids, e.g., stearic acid and polyolefins, especially polyethylenes, which are preferred. These can be used in the form of solutions and emulsions.

A polyethylene emulsion of 10 parts of polyethylene (Bercen, Inc.'s Bersize S-200, 50% solids) in 100 parts by weight of water provides a particularly desirable solution to afford lubricity to the fibers. Fiber residence times sufficient to generate a lubricated surface are used. Time of at least about 5 seconds in the polyethylene medium has been found to be desirable.

The method for producing an oxidized surface on the metal-coated filament comprises in general exposing the outer surface to an oxidizing medium. The metal surface, of course, will be one capable of oxidation. Chemical or atmospheric techniques, and the like, can be employed, e.g., with nickel, tin, copper, brass, and the like, and the use of heat is recommended because the rate of production of the surface oxide coating is enhanced. It is convenient to use air or an oxygen-containing gas as the medium for oxidation and to use steam as a source of heat. It is especially convenient to use a dichromating bath as a medium for oxidation. Sufficient time is provided to produce the metal oxide coating, preferably a uniform, thin, coating. In a continuous process, using steam and air, only a fraction of a second is preferred, e.g., about 0.5 seconds, although less or more time can be allowed. For best results, the filaments are dried prior to being surface treated.

If the surface treated and/or oxidized metallic filaments are woven, knitted or laid up onto the mats, laminates can be obtained. Testing has shown that composites made from unidirectional tapes of 75 parts of surface treated fibers according to this invention with 25 parts, by weight, of epoxy resin and curing, are about 200% better in terms of short beam shear strength at room temperature, and at elevated moist temperature, than those made with unsized fibers.

The fibers surface treated and/or surface oxidized in accordance with the process of the present invention also have been woven into fabric patterns. It has been observed that the fuzz typically extending randomly from the metal-coated fiber do not interfere with the weaving after the sizing has occurred. Further, the woven material can be formed into a fabric pattern very easily by virtue of the lubricity that inheres in the surface treated material. Conversely, surface treated nickel-coated carbon, graphite, or other high strength fiber, has been found to have excellent lubricity and lacks abrasiveness, facilitating weaving. Also surface treated fibers avoid random fibers extending from the fibers which can cause an accumulation of fuzzy materials which interfere considerably with any weaving pattern by depositing on guides in the machines, etc.

Further, the surface treated materials can act as water displacement agents which reduce the tendency of composites made from the coated fibers to delaminate after being put into a plastic matrix, and exposed to moisture.

Practice has taught that a carbon fiber coated with nickel and treated with steam, e.g., distilled water steam, or a dichromating solution, preferably, will provide a nickel oxide surface, dense and adherent of 15–50 angstroms thick, particularly compatible with aminosilane, and this is very useful to produce composites with polymers having desirable characteristics.

DESCRIPTION OF THE PREFERRED EMBODIMENTS

Unidirectional tapes were made by passing tows of nickel plated graphite filaments through a surface treating bath comprising a water based solution/emulsion gamma-aminopropyl triethoxy silane and poly(vinyl acetate) at pH 9 in the amounts specified hereinafter, air-drying, and winding on a mandrel to produce one layer thick, 52 tow bundles wide (Ca, 2 inches) tapes. The tapes are painted on the mandrel with a commercial thermosettable epoxy resin composition (CYCOM ® 985, American Cyanamid Company). The impregnated tapes are carefully removed from the mandrel by slitting and laid up in a mold for compressing into test bars from which pieces to measure short beam shear strength (0.56 in. × 0.25 in. × 0.08 in.) can be cut for testing according to ASTM D2344.

Wet testing is carried out on samples that have been immersed in boiling dionized water for 48 hours.

The compositions used and the results obtained are set forth in Table 1.

TABLE 1

| SURFACE TREATED NICKEL COATED GRAPHITE/EPOXY COMPOSITES | | | | | |
|---|---|---|---|---|---|
| | EXAMPLE | | | | |
| | 1 | 2 | 3 | 4 | 1A* |
| Composition (parts by weight) | | | | | |
| Epoxy resin/hardener/catalyst[c] | 75 | 75 | 75 | 75 | 75 |
| Nickel Coated Graphite Fibers Surface Treated With 0.2% silane[a]/0.2% poly(vinyl acetate)[b] | 25 | — | — | — | — |
| Surface treated with 0.4% silane[a]/0.4% poly(vinyl acetate)[b] | — | 25 | — | — | — |

TABLE 1-continued

SURFACE TREATED NICKEL COATED GRAPHITE/EPOXY COMPOSITES

| | EXAMPLE | | | | |
|---|---|---|---|---|---|
| | 1 | 2 | 3 | 4 | 1A* |
| Surface treated with 0.8% silane[a]/0.8% poly(vinyl acetate)[b] | — | — | 25 | — | — |
| Surface treated with 1.2% silane[a]/1.2% poly(vinyl acetate)[b] | — | — | — | 25 | — |
| Surface treated with 0.8% silane[a]/15% poly(vinyl acetate)[b] | — | — | — | — | 25 |
| Properties | | | | | |
| Short beam shear strength | | | | | |
| Dry, lb./in.$^2$ × 10$^3$ | 14.5 | 13.5 | 13.2 | 13.4 | 4.8 |
| Wet, lb./in.$^2$ × 10$^3$ | 6.3 | 7.3 | 6.9 | 6.4 | 2.0 |

*Control
[a]Gamma-aminopropyltriethoxy silane
[b]Bordon Chemical Co. Polyco ® 2113
[c]CYCOM ® 985, American Cyanamid Company The results demonstrate that composites of nickel coated graphite surface treated according to this invention have substantial advantages in physical properties in comparison with those made according to the current state of the art.

The invention may be varied in ways which will suggest themselves to those skilled in this art in light of the above, detailed description. For example, instead of a nickel coated graphite filament, a nickel coated polyaramide filament can be used. All such obvious variations are within the full intended scope of the appended claims.

What is claimed is:

1. A process for surface treating metallic filaments comprising:
    (a) passing the metallic filaments through a medium comprising between about 0.1 and about 2.5 percent by weight of a silane and between about 0.1 and 2.5 percent by weight of a poly(vinyl acetate); and
    (b) drying the metallic filaments to set the material on the filaments.

2. A process as defined in claim 1 wherein said medium comprises both the silane and the poly(vinyl acetate).

3. A process as defined in claim 1 wherein the medium is in at least two parts, at least one part comprising the silane and at least a second part comprising the poly(vinyl acetate).

4. A process as defined in claim 1 wherein said medium comprises from about 0.2 to about 1.2 percent by weight of said silane and from about 0.2 to about 1.2 percent by weight of said poly(vinyl acetate).

5. A process as defined in claim 4 wherein said medium comprises about 0.8 percent by weight of said silane and about 0.8 percent by weight of said poly(vinyl acetate).

6. A process as defined in claim 1 wherein said medium is a water based medium.

7. A process as defined in claim 6 wherein the pH of the water based medium is in the range of between about 3.5 and about 9.

8. A process as defined in claim 1 wherein the residence time of the fiber is the medium is at least about 0.5 seconds.

9. A process as defined in claim 1 wherein step (b) is carried out under elevated temperature conditions.

10. A process as defined in claim 1 wherein the silane is coupled to the surface of the metallic filament.

11. A process as defined in claim 1 wherein the metallic filament has a metal oxide surface prior to step (a).

12. A process as defined in claim 11 wherein the metal is nickel having a nickel oxide or silver having a silver oxide surface.

13. A process as defined in claim 1 wherein the filament comprises a metal coated fiber wherein the core fiber comprises carbon or graphite.

14. A process as defined in claim 1 wherein the filament comprises a metal coated fiber wherein the core comprises an aramid fiber.

15. Metallic filaments surface treated by the process of claim 1.

16. Metallic filaments surface treated by the process of claim 4.

17. Metallic filaments surface treated by the process of claim 5.

18. Metal coated filaments wherein the core comprises carbon or graphite surface treated by the process of claim 1.

19. Metal coated filaments wherein the core comprises carbon or graphite surface treated by the process of claim 4.

20. Metal coated filaments wherein the core comprises carbon or graphite surface treated by the process of claim 5.

21. A composite comprising the metallic filaments of claim 18 dispersed in a polymeric matrix.

22. A composite comprising the metallic filaments of claim 19 dispersed in a polymeric matrix.

23. A composite comprising the metallic filaments of claim 20 dispersed in a polymeric matrix.

24. A composite as defined in claim 21 in the form of a laminated sheet.

25. A composite as defined in claim 22 in the form of a laminated sheet.

26. A composite as defined in claim 23 in the form of a laminated sheet.

* * * * *